(12) United States Patent
Cronk et al.

(10) Patent No.: US 11,836,280 B2
(45) Date of Patent: Dec. 5, 2023

(54) MOBILE DEVICE CASE FOR SECURED ACCESS AND IMPROVEMENTS

(71) Applicants: Connor Cronk, Moorestown, NJ (US); Brian Cronk, Moorestown, NJ (US)

(72) Inventors: Peter Cronk, Moorestown, NJ (US); Connor Cronk, Moorestown, NJ (US)

(73) Assignees: Brian Cronk, Moorestown, NJ (US); Connor Cronk, Moorestown, NJ (US)

( * ) Notice: Subject to any disclaimer, the term of this patent is extended or adjusted under 35 U.S.C. 154(b) by 0 days.

(21) Appl. No.: 17/978,243

(22) Filed: Nov. 1, 2022

(65) Prior Publication Data

US 2023/0052605 A1 Feb. 16, 2023

Related U.S. Application Data

(62) Division of application No. 16/663,540, filed on Oct. 25, 2019, now Pat. No. 11,520,942.

(51) Int. Cl.
*G06F 21/86* (2013.01)
*H04B 1/3888* (2015.01)
(Continued)

(52) U.S. Cl.
CPC .............. *G06F 21/86* (2013.01); *A45F 5/02* (2013.01); *G06K 19/005* (2013.01);
(Continued)

(58) Field of Classification Search
CPC ......... G06F 21/86; A45F 5/02; G06K 19/005; G08B 13/2402; G08B 13/2434;
(Continued)

(56) References Cited

U.S. PATENT DOCUMENTS 6,068,401 A 5/2000 Ho
9,460,309 B2 * 10/2016 Zar .................. B65D 33/00
(Continued)

FOREIGN PATENT DOCUMENTS

BR 202012030210 9/2014
CN 104414088 3/2015
(Continued)

OTHER PUBLICATIONS

Integrated Biometrics, "LES Film Technology, Fingerprint Sensor Descriptions and Alternative Fingerprint Technologies," https://integratedbiometrics.com/wp-content/uploads/2016/08/LES_White_Paper.pdf, Integrated Biometrics, Spartanburg, SC, pp. 1-16.
(Continued)

*Primary Examiner* — Yuwen Pan
*Assistant Examiner* — Angelica Perez
(74) *Attorney, Agent, or Firm* — DUANE MORRIS LLP

(57) ABSTRACT

Mobile device cases are provided which, in a first embodiment, selectively limit a user's ability to control the user's own mobile electronic device. The case includes front and rear portions joined together and defining therein an opening for receiving a mobile electronic device, such as a mobile phone. A locking mechanism is provided for selectively securing the opening in a first locked position to prevent operational access to the mobile electronic device by the user until a predetermined condition is met. The case includes an indicia of time visible to the user during the period of time of prevented operational access. In a further embodiment, a case is provided with first and second polymeric shells each having an interior and an exterior surface thereon and connected together by at least one hinge portion. The first and second shell portions form a cavity of sufficient size to cover a mobile electronic device sufficiently to prevent access by its user. Tamper resistant and ultrasonic
(Continued)

sensor defeating mobile device case embodiments are also contemplated by this invention.

5 Claims, 13 Drawing Sheets

(51) Int. Cl.
| | |
|---|---|
| *H04W 12/08* | (2021.01) |
| *H04M 1/667* | (2006.01) |
| *G08B 13/24* | (2006.01) |
| *H04W 4/021* | (2018.01) |
| *A45F 5/02* | (2006.01) |
| *G06K 19/00* | (2006.01) |
| *H04M 1/18* | (2006.01) |
| *H04M 1/72457* | (2021.01) |
| *H04M 1/72463* | (2021.01) |

(52) U.S. Cl.
CPC ....... *G08B 13/2402* (2013.01); *H04B 1/3888* (2013.01); *H04M 1/185* (2013.01); *H04M 1/667* (2013.01); *H04M 1/72457* (2021.01); *H04M 1/72463* (2021.01); *H04W 4/021* (2013.01); *H04W 12/08* (2013.01); *H04M 1/724631* (2022.02)

(58) Field of Classification Search
CPC .... H04B 1/3888; H04M 1/185; H04M 1/667; H04M 1/72457; H04M 1/72463; H04M 1/724631; H04W 4/021; H04W 12/08; H04W 12/30; H04W 12/06; H04W 12/61; H04L 63/0861; A45C 11/00; A45C 2011/002
See application file for complete search history.

(56) References Cited

U.S. PATENT DOCUMENTS

| | | | |
|---|---|---|---|
| 9,819,788 B2 | 11/2017 | Dugoni | |
| 10,460,539 B2* | 10/2019 | Zielkowski | A45F 3/02 |
| 2006/0196792 A1* | 9/2006 | Barth | H04B 1/3838 206/320 |
| 2011/0000941 A1 | 1/2011 | Volk | |
| 2012/0061134 A1* | 3/2012 | Kennedy | H04B 1/3888 174/388 |
| 2013/0126531 A1 | 5/2013 | Hynecek et al. | |
| 2013/0248064 A1 | 9/2013 | Dockman | |
| 2014/0128131 A1 | 5/2014 | Sin | |
| 2014/0185852 A1 | 7/2014 | Pereira | |
| 2014/0355807 A1 | 12/2014 | McDowell | |
| 2016/0336988 A1* | 11/2016 | Smith | B32B 37/08 |
| 2017/0208924 A1 | 7/2017 | Wu | |
| 2017/0245571 A1 | 8/2017 | Csillag | |
| 2019/0082321 A1 | 3/2019 | Dugoni | |
| 2019/0104831 A1 | 4/2019 | Lazzara | |
| 2020/0213850 A1* | 7/2020 | Dugoni | H04B 1/3888 |

FOREIGN PATENT DOCUMENTS

| | | | |
|---|---|---|---|
| CN | 209151222 | | 7/2019 |
| DE | 10206326 | * | 4/2003 |
| JP | 60183887 | | 12/1985 |

OTHER PUBLICATIONS

Grabham, Dan, "In-Display Fingerprint Readers: How Do They Work and What Phones Will We See Them In?," https://www.pocket-lint.com/phones/news/huawei/146063-in-display-fingerprint-readers-how-do-they-work, Feb. 28, 2019, pp. 1-5.
The Whiz Cells, "The 5 Largest Cell Phone Screens on the Market Today," https://www.thewhizcells.com/the-5-largest-cell-phone-screens-on-the-market-today/, Feb. 22, 2019, pp. 1-3.
Tung, Liam, "Galaxy S10 Ships With Screen Protector as Others May Block Fingerprint Sensor," https://www.zdnet.com/article/galaxy-s10-ships-with-screen-protector-as-others-may-block-fingerprint-sensor/, Mar. 1, 2019, pp. 1-5.
Kennemer, Quentyn, "Does the Galaxy S10 Fingerprint Sensor work with Screen Protectors?," https://www.androidcentral.com/does-galaxy-s10-fingerprint-sensor-work-screen-protectors, Feb. 20, 2019, pp. 1-7.
Salem, Elie and Wilson, Maya, "One in Three Yondr Bags Broken After First Advisory," https://thewilsonbeacon.com/13026/news/one-in-three-yondr-bags-broken-after-first-advisory/, The Beacon, Nov. 10, 2018, pp. 1-3.
Morrissey, Janet, "Your Phone's on Lockdown. Enjoy the Show.," The New York Times, https://www.nytimes.com/2016/10/16/technology/your-phones-on-lockdown-enjoy-the-show.html, Oct. 15, 2016, pp. 1-3.
Walden, Eric, "Utah Fans Review Jack White's Cellphone-Free Show: 'Ridiculous' or 'Friggin' Awesome,' Depending on Whom you Ask," The Salt Lake Tribune, https://www.sltrib.com/artsliving/music/2018/08/10/utah-fans-review-jack/, Aug. 10, 2018, pp. 1-4.
Gregory, Alice , "This Startup Wants to Neutralize Your Phone-And Un-Change the World," Wired, https://www.wired.com/story/free-speech-issue-yondr-smartphones/, Jan. 16, 2018, pp. 1-8.
Hill, Simon, "How to Pick the Best Case to Protect Your Device from Life's Daily Hazards," Digital Trends, https://www.digitaltrends.com/mobile/pick-good-case-cover/, May 9, 2017, pp. 1-12.
Screen Sizes, "Viewport Sizes and Pixel Densities for Popular Devices," http://screensiz.es/phone, printed Oct. 15, 2019, pp. 1-6.
Universal Motorcycle Clock Watch Waterproof Stick-On Motorbike Digital Clock Dia. 1.1, https://www.aliexpress.com/item/32840930147.html, printed Oct. 15, 2019, pp. 1-5.
Handguard II® (White), https://www.wellslamontindustrial.com/product/handguard-ii-white-whizard-wire-gloves/, printed Oct. 15, 2019, pp. 1-4.
Deitzel, J.M. et al., "High performance polyethylene fibers," Elsevier Ltd., http://dx.doi.org/10.1016/8978-0-08-100550-7.00007-3, pp. 1-20.
https://www.overyondr.com/, printed Oct. 15, 2019, pp. 1-5.
Nathan Sports, Quick Stash Run Hat, https://www.nathansports.com/products/quick-stash-run-hat, © 2021 Nathan Sports, printed Aug. 4, 2021, pp. 1-4.
Etsy, 90210 Wholesale, Unisex Baseball Cap Plain Pocket Cadet Patrol Military Hats Camo Army Caps Fashion Casual Hat, https://www.etsy.com/listing/687711600/unisex-baseball-cap-plain-pocket-cadet, printed Aug. 4, 2021, pp. 1-13.
Chalktalk Sports, Ultra Pocket Hat for Runners—Black, https://www.goneforarun.com/ultra-pocket-hat-for-runners-black/tr-33136.html?cgid=gfar, printed Aug. 4, 2021, pp. 1-5.
Amazon, LASMEX 17mm Instant Buttons, https://www.amazon.com/Upgrated-Tightener-Adjuster-Replacement-Adjustable/dp/B08THJG8W5, printed Aug. 4, 2021, pp. 1-9.
Non-Final Office Action dated Apr. 6, 2023 in U.S. Appl. No. 17/394,731.
Abramovitch, Seth, "How Dave Chappelle Is Creating a "No Phone Zone" for His Chicago Shows," Hollywood Reporter, https://www.hollywoodreporter.com/news/how-dave-chappelle-is-creating-844886, Dec. 1, 2015, pp. 1-4.
Burch, Cathalena E., "Ali Wong's Tucson Show to Require that Cell Phones be Locked in Pouches," Arizona Daily Star, https://tucson.com/news/local/ali-wong-s-tucson-show-to-require-that-cell-phones/article_6fc4419b-144c-5a34-adc2-6c241e4a2a26.html, Feb. 16, 2019, pp. 1-4.
Wenzel, John, "How Dave Chappelle Introduced a Cellphone Bagging Program to Denver Schools," The Denver Post, https://www.denverpost.com/2017/08/24/yondr-dave-chappelle-cellphone-bagging-denver-schools/, Aug. 24, 2017, pp. 1-4.
https://www.securitytags.com/the-different-types-of-security-tags/, printed Oct. 15, 2019, pp. 1-6.
ZSDTRP Universal Motorcycle Clocks Watch Waterproof Stick On Motorbike Mount Watch Moto Digital Clock-in Instruments from Automobiles, www.aliexpress.com/item/32899951427.html, printed Oct. 15, 2019, pp. 1-14.

* cited by examiner

MOBILE DEVICE CASE FOR SECURED ACCESS AND IMPROVEMENTS

CROSS REFERENCE TO RELATED APPLICATIONS

The present application is a divisional application of U.S. Ser. No. 16/663,540, filed Oct. 25, 2019, which is hereby incorporated by reference it is entirety.

FIELD OF THE INVENTION

This invention relates to improvements for mobile electronic device cases for selectively securing the mobile device to prevent access by its user until a predetermined condition is met.

BACKGROUND OF THE INVENTION

Secure mobile device bags, such as the YONDR pouch, have recently been provided to schools and other venues in the United States. See Dugoni, U.S. Pat. No. 9,819,788 and US 2019/0082321, hereby incorporated by reference. The YONDR device is generally a smartphone-sized, neoprene or fabric bag that includes locking/unlocking tools. The bag locks at the top and only the teacher or usher, for example, has the unlocking key or base. The cell phone's owner gets to keep the bag and turn their phone to vibrate mode to know whether someone is trying to contact them. The YONDR device allows phone signals to get through, so someone can feel a phone vibrate when a message arrives. Anyone who needs access to their phone during a show may leave the room, have the device unlocked and use the phone in the lobby or outside the venue.

As described in FIGS. 1-3 (Prior Art), as one enters a phone-free area, such as a court room, school or concert venue, their phone 20 will be placed in a fabric pocket case 10 as shown in FIG. 1. Once inside, a magnetic lock including a pin and receiving magnet will lock the top of the case as shown in FIG. 2. The owner of the phone will be able to maintain possession of their phone during court, during the school day, or during the concert. But, to use their phone again, the student or concert spectator, for example, has to step outside the classroom or concert venue and tap the locking mechanism of the fabric case on an unlocking base 30, as shown in FIG. 3.

While YONDR pouches are an aid to many artists who are banning cell phones and digital devices from their shows in order to prevent unauthorized recordings, they are not without some limitations. Because access to the mobile device is prevented, many mobile phone users cannot access their phone to tell the time. See The Salt Lake Tribune, Aug. 10, 2018, "Utah Fans Review Jack White's Cell Phone-Free Show: 'Ridiculous' or 'Friggin' Awesome,' Depending On Whom You Ask"; and Alice Gregory, "This Start-up Wants to Neutralize Your Phone—And Un-Change the World," Wired, Business, Jan. 16, 2018; (meanwhile, those who resisted the temptation to gain back access to their phones, not 5 minutes after relinquishing it, complain that they didn't know the time.) Many cell phone users have grown accustomed to not wearing watches. Without access to their phone, concert goers using YONDR pouches wind up asking other concert goers for the time, which is a distraction to both individuals. Knowing the time is important in to determining when the show begins, or when to meet friends at agreed-upon times and locations, for example.

Another issue that has arisen with YONDR bags is they can become damaged due to vandalism or overuse. In a recent publication, one in three YONDR bags at one high school were found to be broken. See Ellie Salem, "One in Three YONDR Bags Broken After First Advisory", Nov. 10, 2018. In many cases, the students in this survey had forcibly removed the magnetized button, or ripped the bag itself, to gain access to their phones. While YONDR generally replaces these bags, the students have figured out ways to gain access to their phones. It is difficult for instructors to determine which students should be responsible for the broken bags, and there is simply not enough time for teachers to examine every bag after every period, which means that certain students are held unaccountable.

Accordingly, there remains a need for improvements to systems and an apparatus for selectively limiting user control of electronic devices. Such products remain an emerging technology, requiring innovation to overcome the problems associated with lack of access to the phone clock and bag breakage issues.

SUMMARY OF THE INVENTION

In the first embodiment on the invention, a case is provided which selectively limits a user's ability to control the user's own mobile electronic device. The case includes front and rear portions joined together and defining therein an opening for receiving a mobile electronic device. The case further includes a locking mechanism for selectively securing the opening of the case in a first locked position to prevent operational access to the mobile electronic device by the user until a predetermined condition is met. The case includes an indicia of time visible to the user during the period of time of prevented operational access.

In further embodiments of this invention, the indicia of time is provided by a battery operated clock, which can be disposed on the surface of the case, or below its surface, and can be provided so as to show the time through an opening disposed in the case. The battery operated clock can be joined to a portion of the locking mechanism of the case, such as a magnetic or mechanical lock devise. The case can be made of fabric and the battery operated clock can be sewn in a pocket within the fabric, desirably such that the indicia of time can be viewed by the user.

In a further embodiment the case comprises an opening disposed through the case wall so that the time provided on the display of the mobile electronic device can be visible by the user outside of the case without otherwise granting access to the device. This embodiment can be further improved by making the case out of a fabric and providing a substantially transparent material comprising a polymeric layer which is bonded, sewn or adhered to the fabric of the case. In certain improvements, the substantially transparent polymeric material substantially blocks access by the user to the fingerprint sensor disposed on the mobile electronic device. In more preferred embodiments, the polymeric material contains an additive, such as a coating, a layer, or is otherwise of sufficient thickness to block access to a fingerprint sensor.

In a further embodiment of this invention, a case for selectively limiting a user's ability to control said user's own mobile electronic device is provided. The case comprises front and rear portions joined together and defining therein an opening for receiving a mobile electronic device and a locking mechanism for selectively securing said opening in a first locked position to prevent access to the mobile electronic device by the user until a predetermined condition is met. In this embodiment, the case includes first and second polymeric shell portions each having an interior and an exterior surface thereon and connected together by at least one hinge portion. The first and second shell portions form a cavity of sufficient size to cover a mobile electronic device sufficiently to prevent operational access by its user. In further improvements to this embodiment, the locking mechanism can include a magnetic or mechanical lock. If a magnetic lock is used the strength of the magnetism can be selected from standard, super lock, hyper-lock or multi-polar. The cases of these embodiments can further include electronic article surveillance devices. In further embodiments, the case can include a padded surface layer disposed within the cavity for cushioning a mobile electronic device at least during the first locked position. The cases of this invention further can include a padded surface layer comprising a soft compressible material, which when in contact with a glass surface of an electronic mobile device, does not scratch or damage the glass surface. In further embodiments, the soft compressible material can include a foam layer (closed or open), urethane, synthetic or natural rubber, silicone or felt.

In a further embodiment of this invention, a case is provided for selectively limiting a user's ability to control said user's own mobile electronic device, said case comprising front and rear portions joined together and defining therein an opening for receiving said mobile electronic device, and a locking mechanism for selectively securing said opening in a first locked position to prevent operational access to said mobile electronic device by said user until a predetermined condition is met. This case preferably contains, or is made from, a fabric capable of blocking said user's access to an ultrasonic biometric sensor located on said mobile electronic device. In more preferred embodiments, this fabric comprises a first thickness, an additive, a coating, a layer, an air gap, or other material transition, or combination thereof, to block access to an ultrasonic biometric sensor, such as an iris, face or fingerprint sensor, for example. In a further embodiment, the preferred fabric of this embodiment does not substantially block or substantially distort radio wave energy from penetrating the fabric of the case, so that the user can sense vibration when a call is received, for example.

In still a further embodiment of this invention, a case is provided for selectively limiting a user's ability to control said user's own mobile electronic device, said case comprising front and rear portions joined together and defining therein an opening for receiving said mobile electronic device, and a locking mechanism for selectively securing said opening in a first locked position to prevent operational access to said mobile electronic device by said user until a predetermined condition is met. This embodiment includes the improvement of a fabric which includes a reinforcement layer which assists in resisting tapering by the user. The reinforcement layer can include, for example, fibers containing a polymer, glass, carbon, metal or combination thereof, and can alternatively be in the form of, or include, a woven scrim or screen material.

BRIEF DESCRIPTION OF THE DRAWINGS

The accompanying drawings illustrate preferred embodiments of the invention as well as other information pertinent to the disclosure, in which.

DETAILED DESCRIPTION OF THE INVENTION

This invention provides cases, systems and methods for limiting access to mobile electronic devices within certain geographic locations or during specific periods of time, for example. The devices, systems and methods can be used to prevent access to mobile electronic devices, such as mobile phones, by users during educational settings, concert venues, and court proceedings, for example. As used herein, the following terms are defined:

"case" refers to a holder for something such as a mobile electronic device. The holder can have hard and/or soft sides.

"mobile electronic device" refers to a computing device small enough to hold and operate in the hand. Typically, any handheld computer device will have an LCD, FHD or OLED flat screen interface, providing a touchscreen interface with digital buttons and keyboard or physical buttons along with a physical keyboard. Many such devices can connect to the internet or interconnect with other devices. Such devices include smart phones, phones, tablets, personal digital assistant, enterprise digital assistant, and small laptops.

"battery operated clock" refers to an electric clock which is powered by a battery as opposed to hard-wired electricity or a mechanical clock which is generally powered by a hanging weight or a main spring. This may include Quartz clocks and solar powered clocks.

"fabric" includes both natural and synthetic materials and generally is a material made from fibers or threads, for example weaving, knitting, felting, etc., or any cloth, felt, lace or the like, including films and foamed materials, such as rubber, synthetic rubber, neoprene rubber polyurethane, silicone or felt, woven or nonwoven materials, meshes, nets, etc., or combinations thereof, such as nylon mesh reinforced woven cotton, rayon, or cotton/rayon blended fabric.

"fingerprint sensor" is a type of a security system using biometrics, such as a type of technology that identifies and authenticates the fingerprints of an individual in order to grant or deny access to a computer system, such as a mobile phone.

Figure 4:
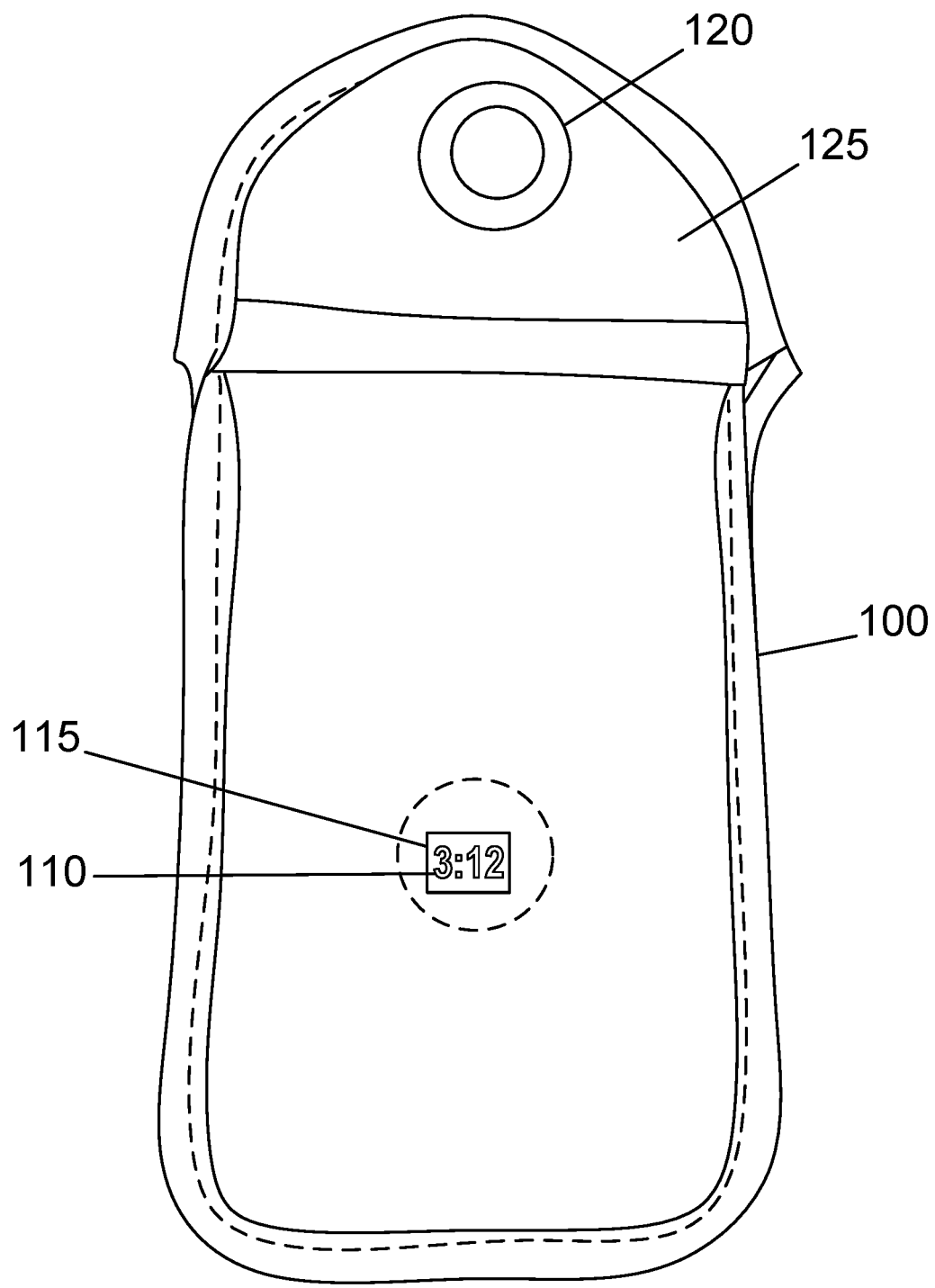
FIG. 4: is a front planar view of a preferred case of this invention showing indicia of time visible to a user.

With reference to the figures and in particular, FIGS. 4-13 thereof, there is shown preferred cases 100, 200, 300, 400, 500 and 600 of this invention. In a first embodiment of a case 100, the device selectively limits a user's ability to control the user's own mobile electronic device. The case includes front and rear portions joined together. FIG. 4 shows a rear portion of case 100 having an opening 15 which exposes an indicia of time 110. The rear portion of the case 100 further includes a locking mechanism 120 and a flap 125 for enclosing a mobile electronic device (not shown). In this instance the indicia of time 110 is a digital time, although the showing of hands of a clock in analog format is also acceptable.

Figure 1:
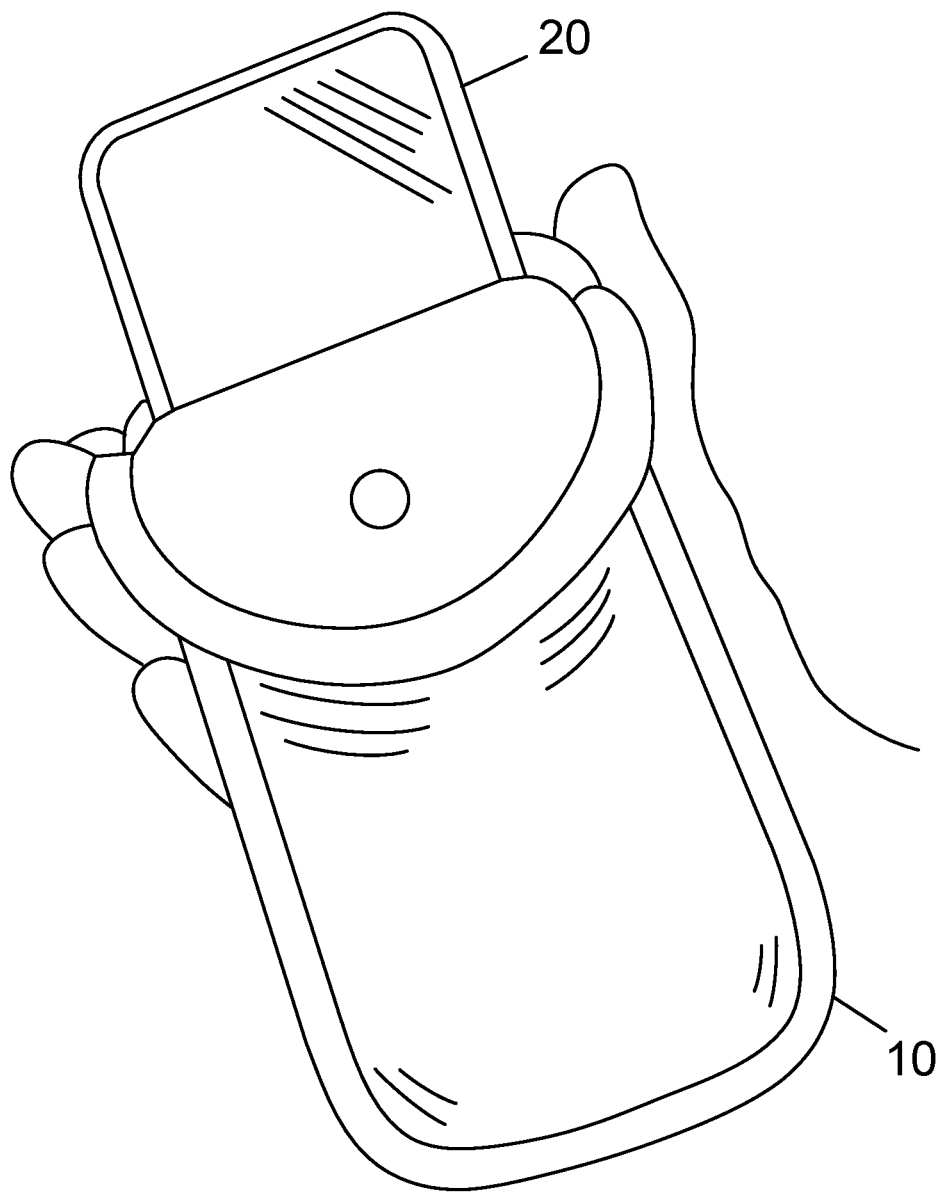
FIG. 1: is a front perspective view of a mobile electronic device being inserted into a conventional security pouch of the prior art.
Figure 2:
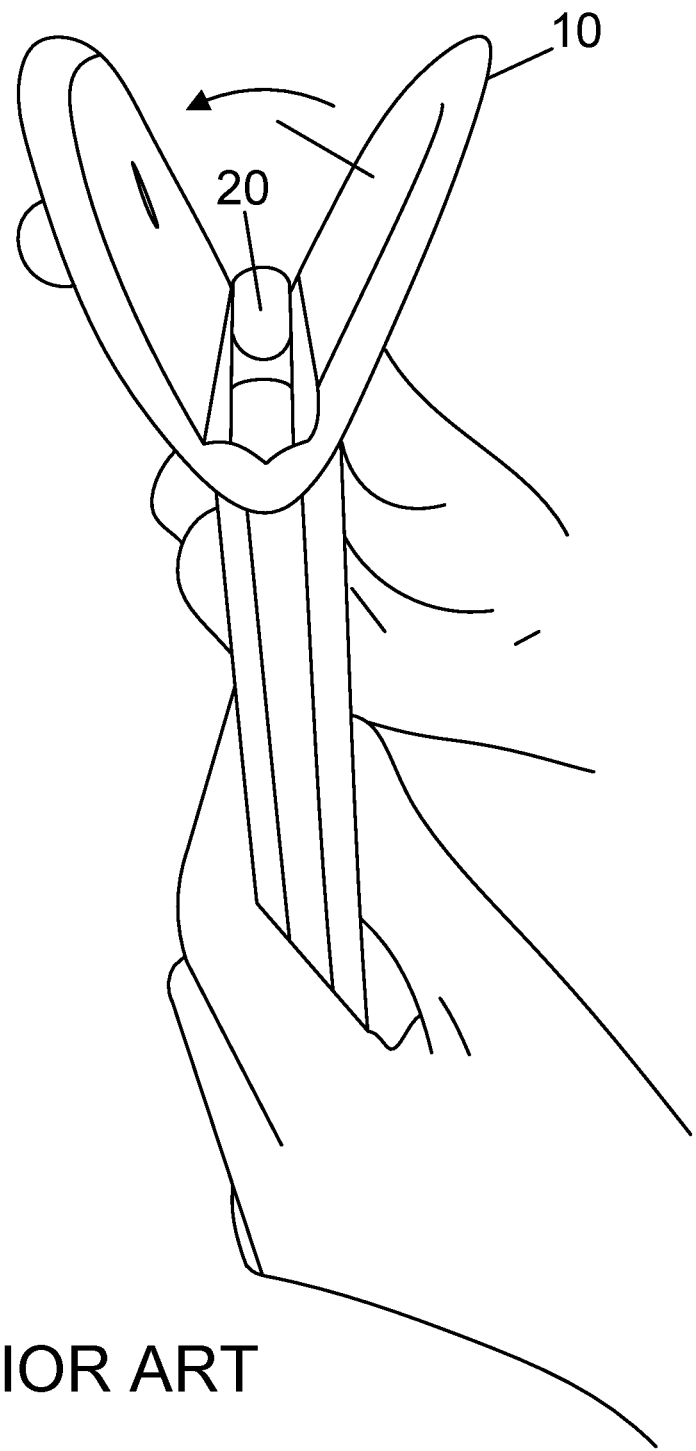
FIG. 2: is a side perspective view of the mobile electronic device being inserted into a prior art security pouch prior to sealing the pouch to prevent access.
Figure 3:
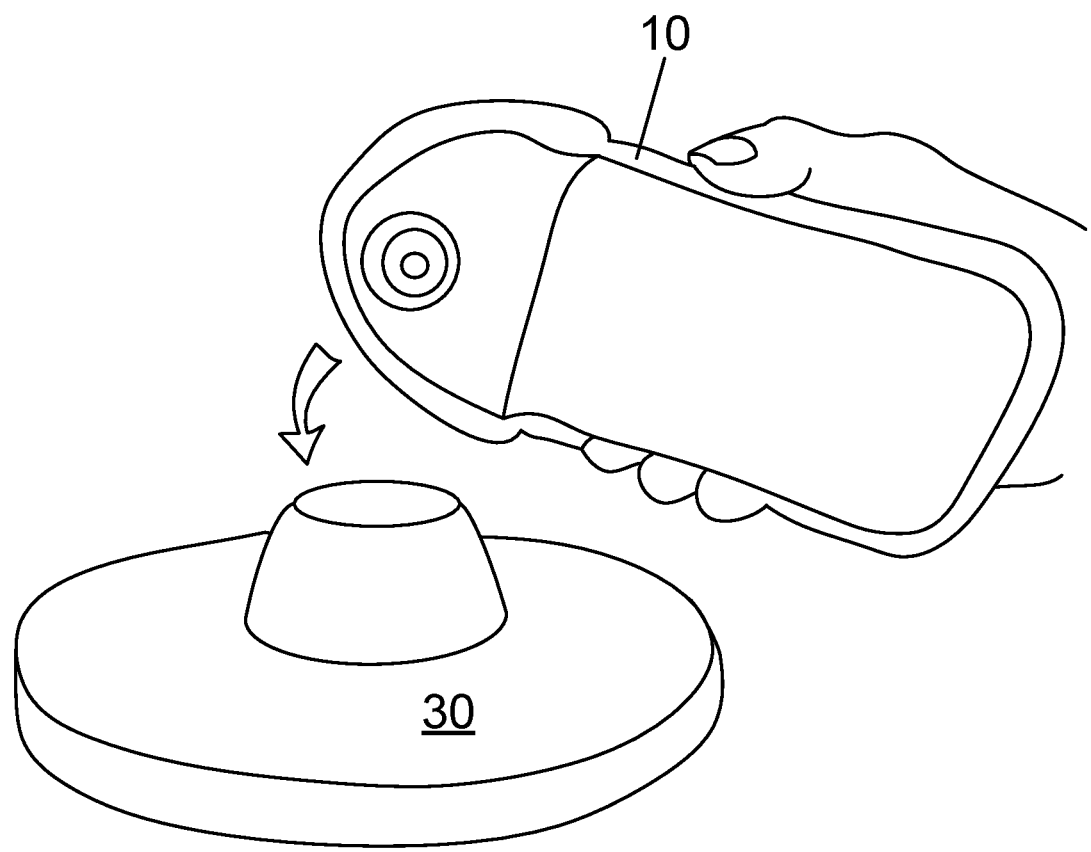
FIG. 3: is a front perspective view of the security pouch of FIG. 1 being deactivated on a prior art base.
Figure 5:
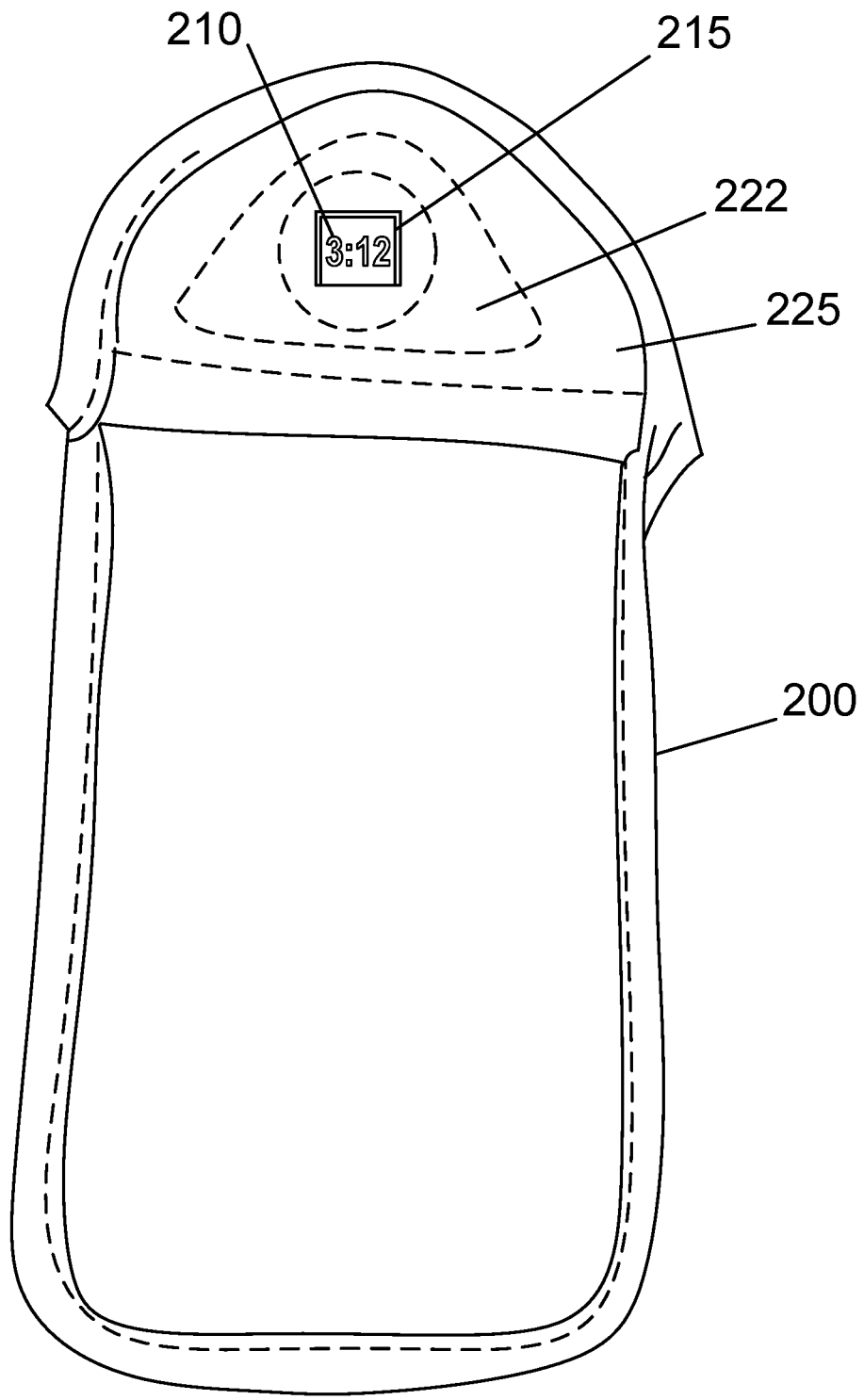
FIG. 5: is a rear planar view of a preferred case of this invention showing an indicia of time visible to a user located on a rear flap proximate to a locking mechanism.
Figure 6:
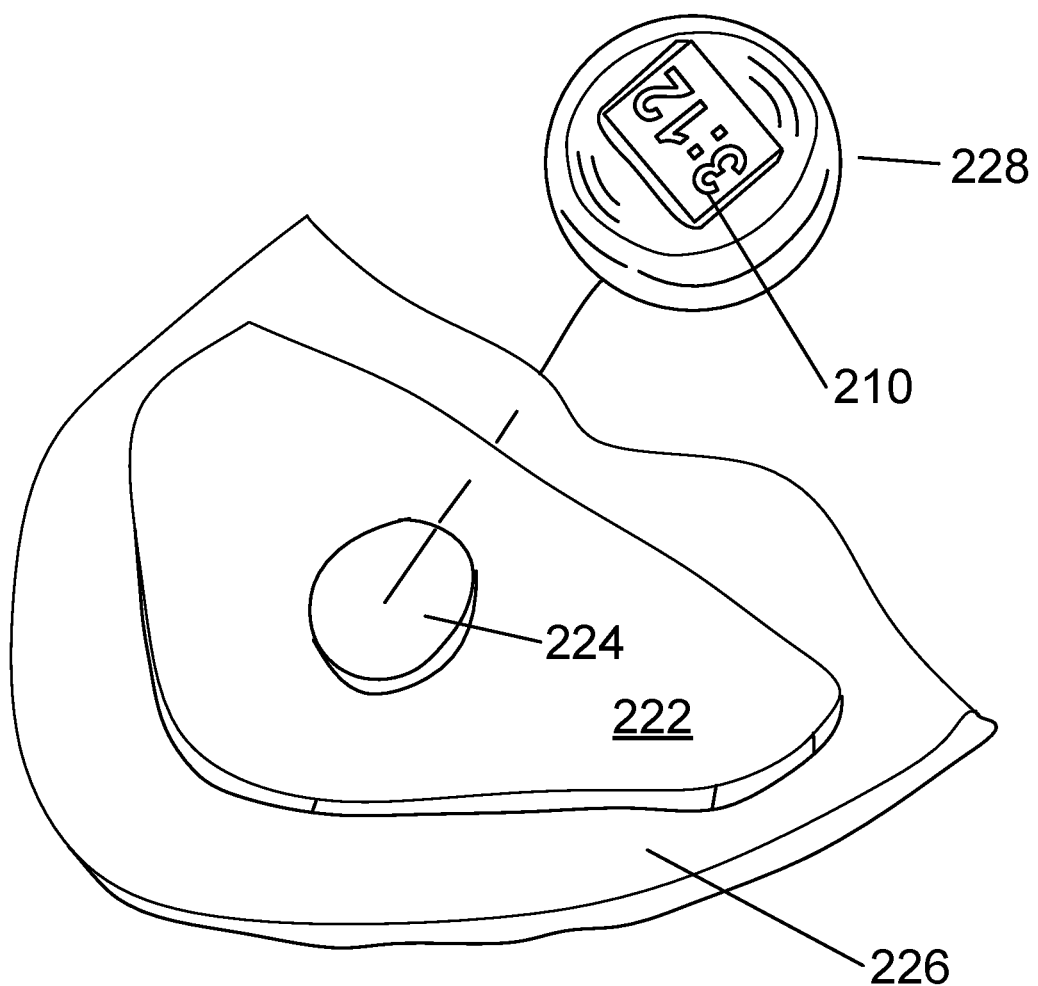
FIG. 6: is a partial front perspective exploded view showing the introduction of a battery operated clock joined to a button of a mechanical locking mechanism within a preferred case embodiment.

In a further embodiment of FIG. 5, there is shown a case for selectively limiting a user's ability to control his or her own mobile electronic device. In this embodiment, an indicia of time 210 is provided in digital form on the front portion of case 200. The indicia of time 210 is visible by the user through an opening 215 cut into the fabric or other material of the case (such as a polymeric shell). The fabric can be located along the front portion proximate to the enclosed phone or along the top flap 225, as shown. In one version shown in FIG. 6, a battery operated clock 228 showing the indicia of time 210 is bonded, sewn into the fabric (such forming a fabric pouch with a window or opening for viewing the time) as or adhered to the fabric, or other material of the case. In this particular embodiment, the battery operated clock 228 is adhered, such as by heat sealing or hot melt adhesive, to the pin button 224 of a magnetic locking device. The pin button 224 is mounted through a base 222 which is preferably a thermoplastic or thermosetting polymeric material. The pin button 224 and base 222 is then inserted (or glued or sewn) to the fabric flap 226 so that pin is available for locking in a receiver channel of a magnetic locking mechanism (such as shown in FIG. 2).

Figure 7:
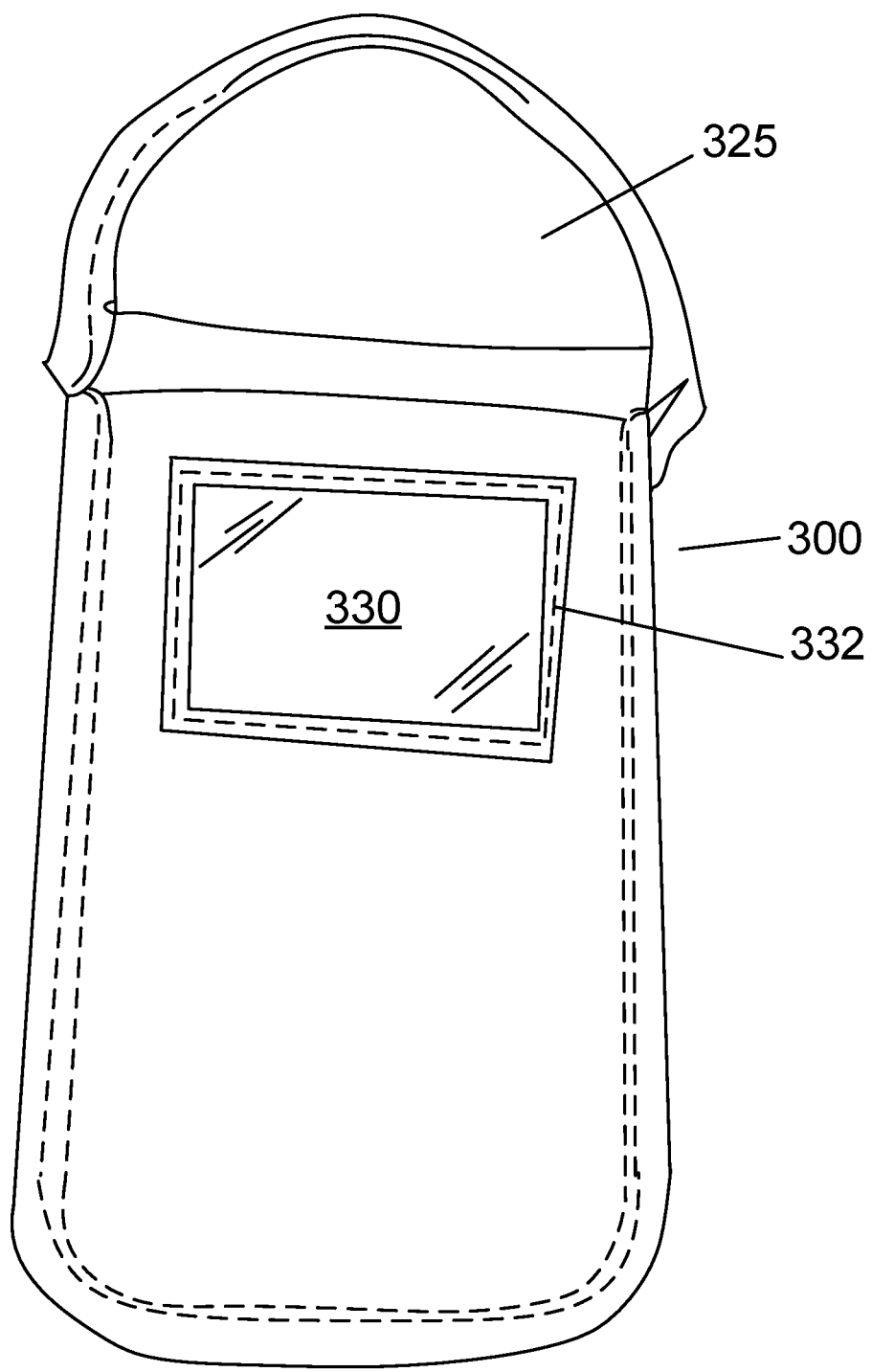
FIG. 7: is a rear perspective view of the front layer of another case of this invention showing a substantially transparent material joined with threads to the inside of the case to provide a window for viewing an indicia of time.

In a further embodiment of this invention, a front portion of a case 300 is provided in FIG. 7, preferably also made of a fabric material. In this instance, we are looking at the inside of the front portion of the case prior to sewing it to a rear portion to make an opening or containment area for a mobile electronic device. The case 300 includes a flap 325 and an opening cut through the fabric of the front portion of the case. Over this opening is a preferred window 330 made from a substantially transparent or translucent material, sewn with threads 332 (or otherwise adhered) to the fabric of the front portion of the case 300. The window 330 is preferably transparent, substantially optically clearer, or translucent. Transparent and translucent films and fabrics can include transparent vinyl, smoke transparent vinyl, colored transparent vinyl, transparent TPU and TPU EVA clear fabrics; translucent TPU fabric, transparent jelly sheet, translucent polyethylene plastic sheet and translucent polypropylene plastic sheet. Most of these materials can be sewn with thread into a fabric. Alternatively, the transparent material can be glued or bonded onto a fabric or onto a harder case material such as the polymer case of FIG. 10. In such instances, less flexible transparent materials can be employed, such as acrylic sheets, polycarbonate sheets, ABS sheets and plexiglass.

Figure 8:
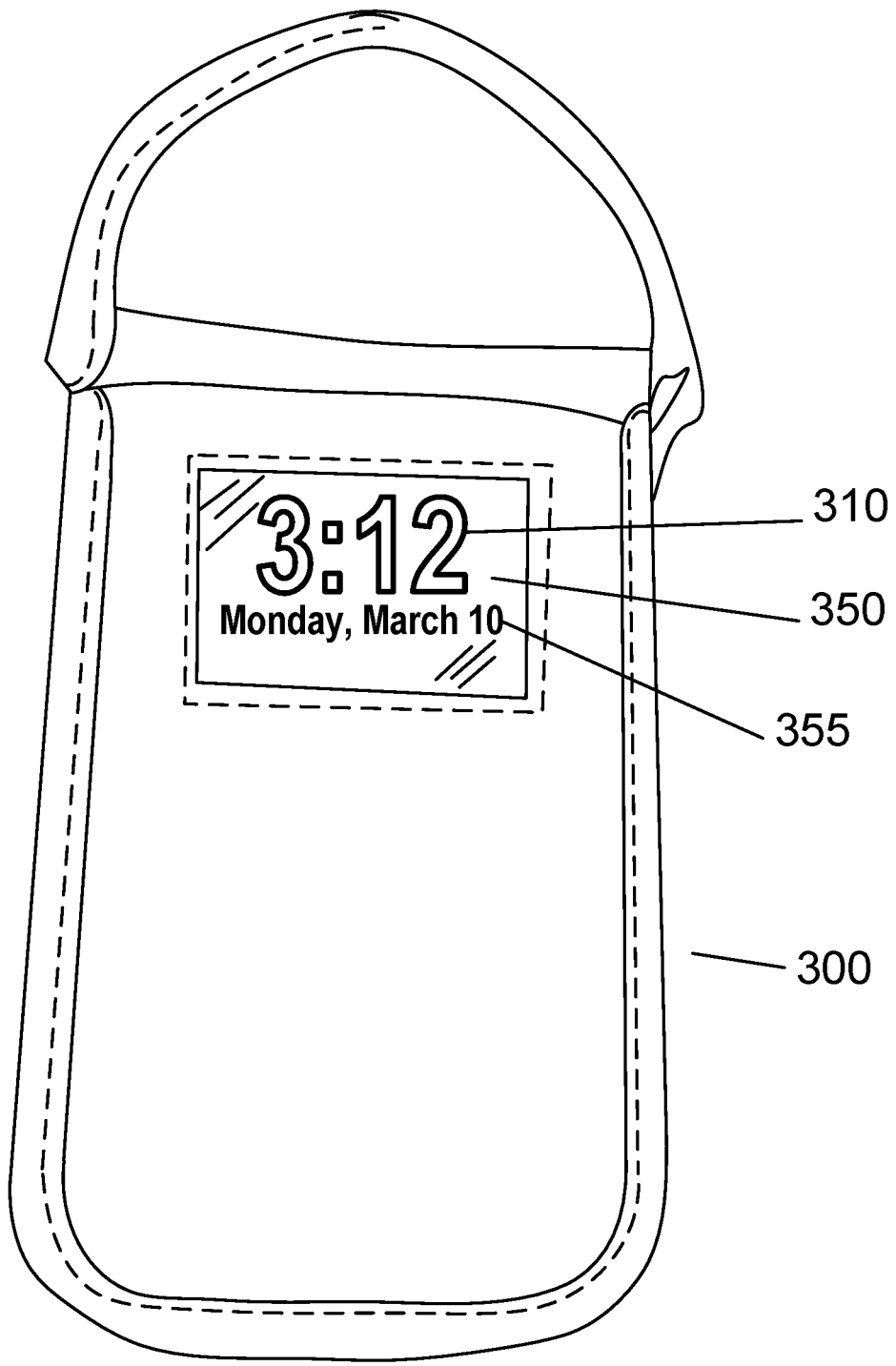
FIG. 8: is a front perspective view of the case, made for the case front layer of FIG. 7 after a mobile electronic device has been secured, revealing a time and date on the display of the electronic device through the substantially transparent material joined to the case's inner portion.
Figure 9:
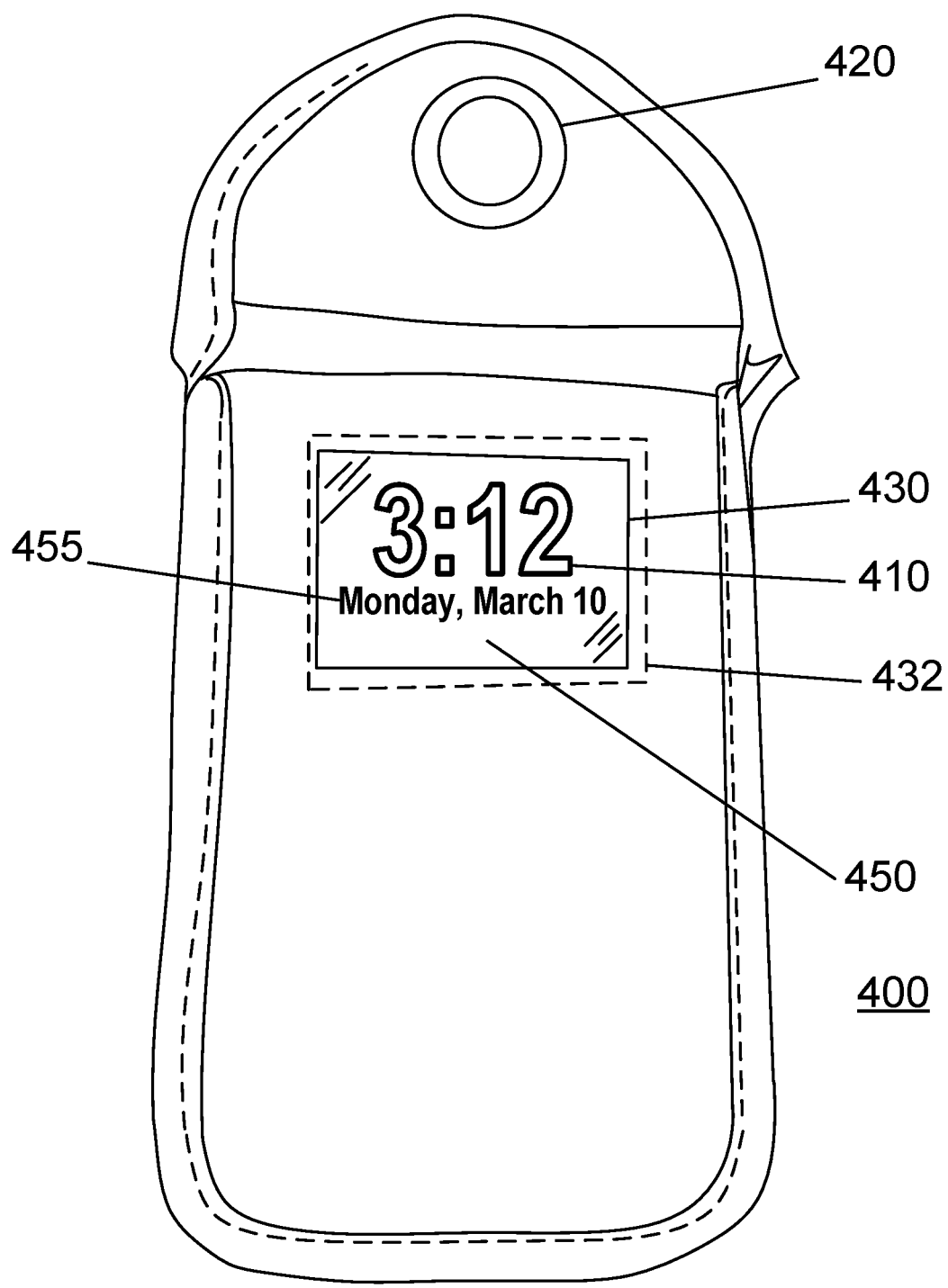
FIG. 9: is a front perspective view of a case of this invention showing a substantially transparent material joined to the case on a rear cover thereof, substantially the opposite side of the case as used in the embodiment of FIG. 8.

Referring to FIG. 8, there is shown case 300 after a mobile electronic device has been inserted into the case 300 and the locking mechanism is engaged. In this embodiment, the indicia of time 310 is provided by the mobile electronic device along with an optional date indicia 355. The time and date can easily be provided by the LCD phone screen 350, if the window 330 is disposed to overlap with the location of the time indicia on the LCD screen of the mobile device. Similarly, in a further embodiment of a case 400, time indicia 410 and date indicia 455 can be provided by phone screen 450 to a rear portion of the case 400, generally in the same location as on the front portion of the case shown in FIG. 8. Case 400 shows the locking mechanism 420 located on its upper flap. The window of substantially transparent material 430 can be similarly applied to the fabric or hard shell of the case 400 using the thread or other materials described for the embodiment of FIG. 8, and the substantially transparent material can comprise a polymeric layer bonded, sewn or adhered to the fabric of the case 400. Substantially similar materials as those described for the transparent material used in FIG. 8 can be used for the case 400.

Figure 10:
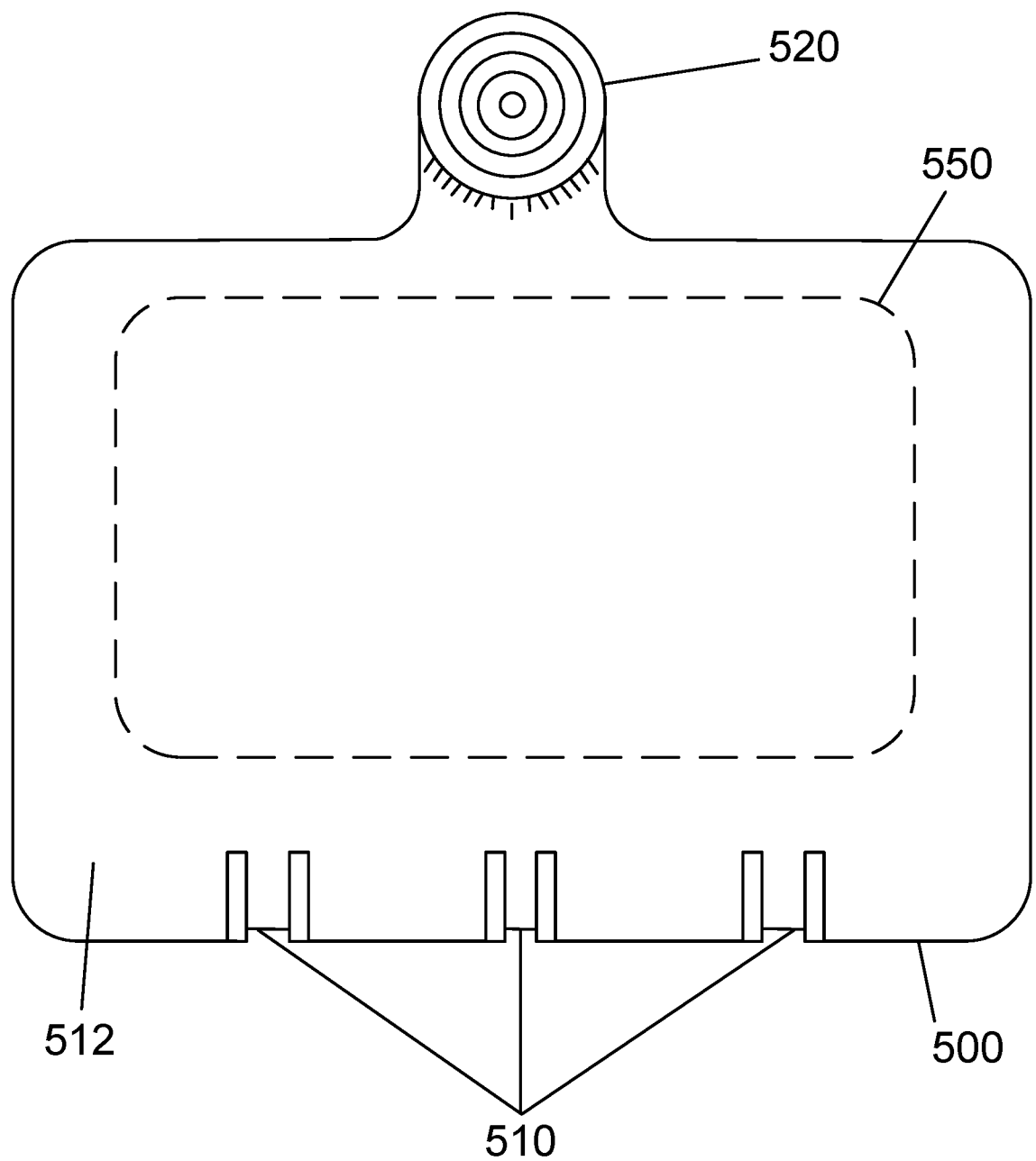
FIG. 10: is a top planar view of a polymer shell case embodiment of the present invention, housing a mobile electronic device shown in phantom.
Figure 11:
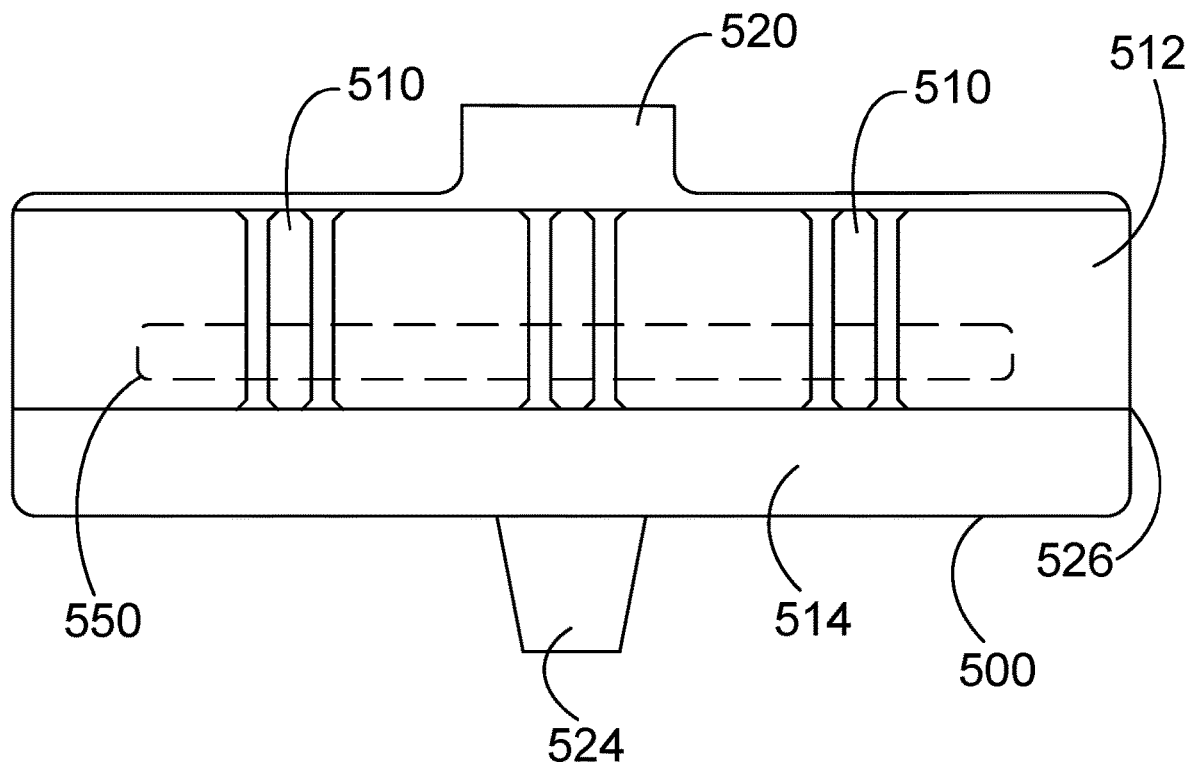
FIG. 11: is a front elevational view of the case of FIG. 10 showing the components of a magnetic locking mechanism and a three component hinge.
Figure 12:
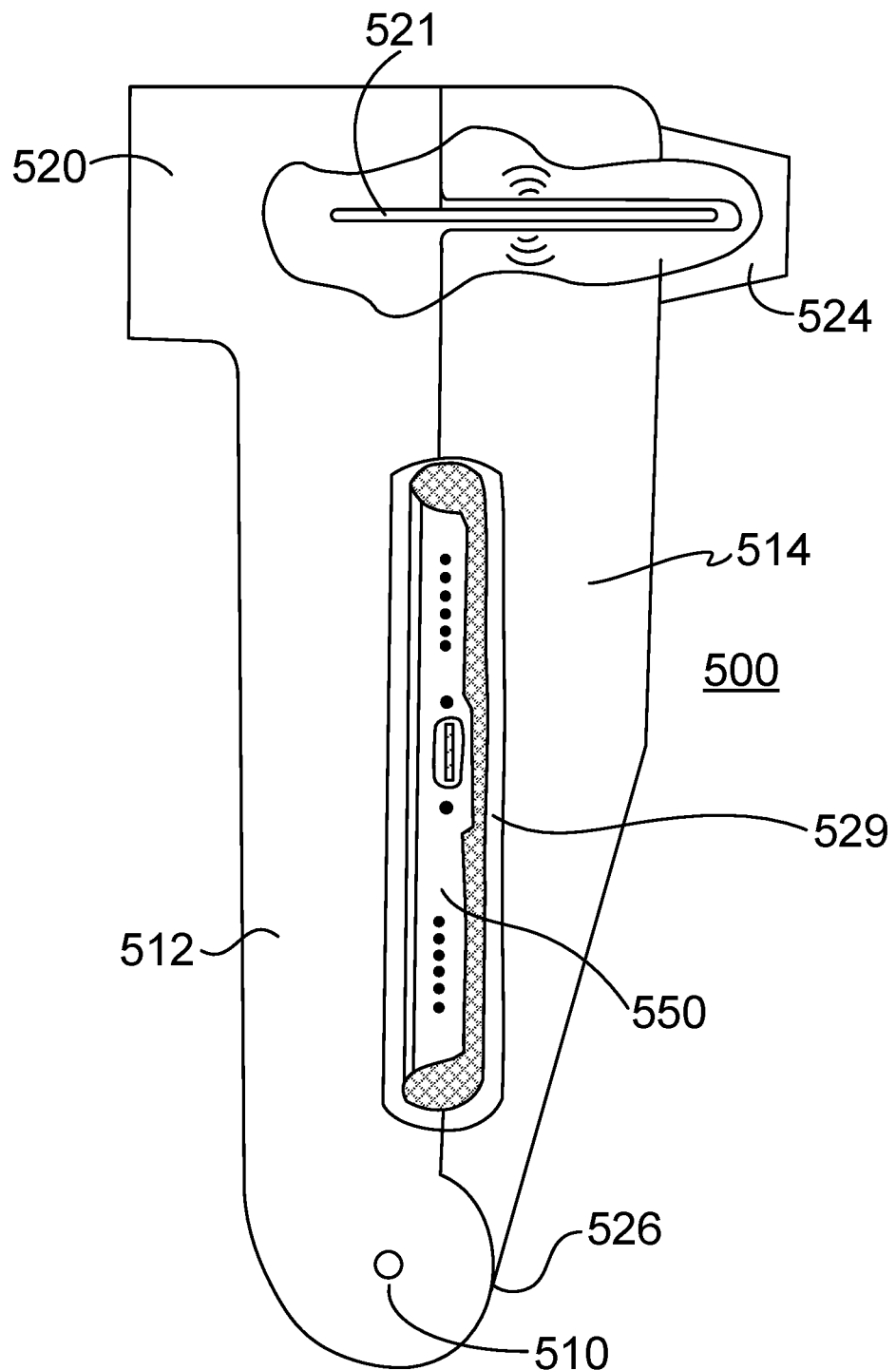
FIG. 12: is a side elevational view of the case of FIG. 10 in which a mobile electronic device is secured.
Figure 13:
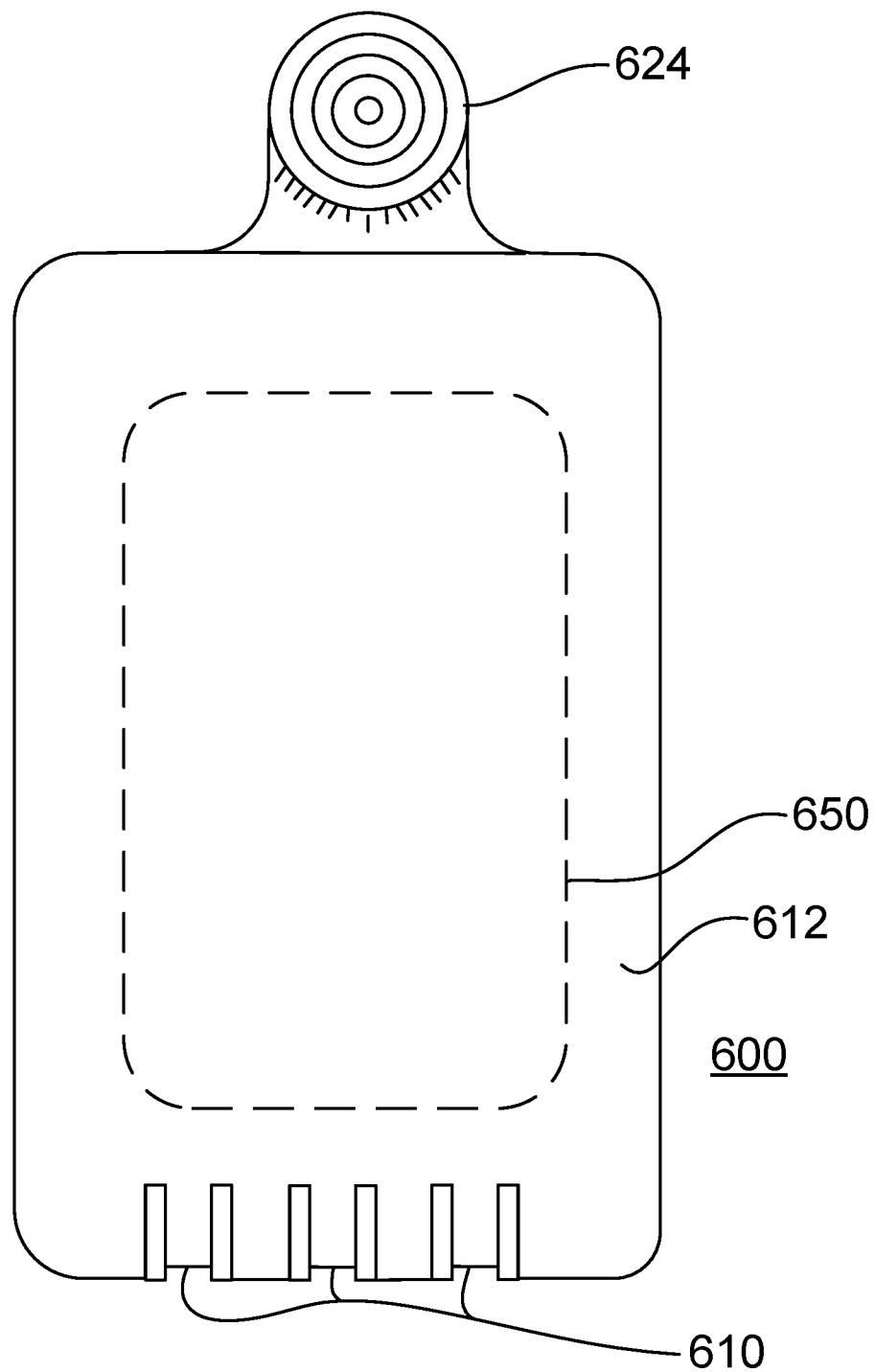
FIG. 13: is a top planar view of a further preferred case of this invention which is oriented longitudinally with a mobile electronic device shown in phantom.

Further with reference to FIG. 10, there is shown a case 500 for selectively limiting a user's ability to control his or her own mobile electronic device to prevent access to the device by the user until a predetermined condition is met. Case 500 includes first and second polymeric shell portions such as top case member 512 and lower case member 514 shown in FIGS. 10-12. The shells defined therein an opening for receiving a mobile electronic device 550, such a mobile phone. A locking mechanism shown as locking mechanism portion 520 and 524 is provided, preferably integral with the case 500, for selectively securing the opening in a first lock position to prevent access to the mobile electronic device 550 by the user until a predetermined condition is met, such as a predetermined time or location, for example. The locking mechanism is shown as having a pin 521 and a pin receiving chamber of a magnetic locking mechanism. The case 500 provides that each first and second polymeric shell portions 512 and 514 have an interior and an exterior surface thereon. The shell portions 512 and 514 are connected together by at least one hinge portion, shown for example as 3 hinges 510, but any number of hinges, for example 1-6 would be appropriate. The first and second shell portions 512 and 514 form a cavity of sufficient size to cover a mobile electronic device 550 sufficiently to prevent access by its user. In this embodiment 500, the mobile electronic device 550 is entirely shielded (except for its sides) by the top case member 512 and lower case member 514 which are joined by a seam 526 shown in FIGS. 11 and 12 proximate to the hinges 510. Partially shielding the mobile device screen is also envisioned, if the fingerprint sensor is shielded, for example. This construction is very much like an "alligator tag" used as security tags in the fashion industry, except that the polymeric area is expanded (preferably by a mold) to provide a cavity for a mobile electronic device. This cavity can be lined with a cushion layer 529 shown in FIG. 12 which can be a padded surface layer disposed within the cavity for cushioning the mobile electronic device 550 at least during the locked position. The padded surface layer 529 can comprise a soft compressible material, for example foamed layer (closed or open), urethane, synthetic or natural rubber, silicone or felt. The hinges 510 can include one or more pins, which are preferably metallic.

In a further embodiment of the preferred case of this invention, a case 600 is provided which includes hinges 610 which are approximately one to five in number, preferably three in number, and has a top case portion 612 large enough to cover a mobile electronic device sufficiently to prevent operational access by the user. In this embodiment 600, the mobile electronic device 650 (shown in phantom) is nearly completely covered by the top case portion 612, along with its lower case member (not shown). The case 600 includes a locking mechanism portion 624 similar to that described for case 500 shown in FIG. 10.

Case Materials:

Fabrics useful in case embodiments 100, 200, 300 and 400 should have preferred characteristic properties of light weight and good tensile strength. Useful fabrics include both natural and synthetic materials and can be made from fibers or threads, for example weaving, knitting, felting, etc., or can be any cloth, felt, lace or the like, including films and foamed materials, such as rubber, synthetic rubber, neoprene rubber polyurethane, silicone or felt, woven or non-woven materials, meshes, scrims, nets, etc., or combinations of fabric and reinforcement layers, such as nylon or glass mesh reinforced woven cotton, rayon or cotton and rayon/polyester blended fabric.

Fiber materials useful in the preferred fabrics may include, e.g., nylon, rayon, cellulose ester, polyvinyl derivatives, polyolefins, polyamides, or polyesters, cuproammonium cellulose (Bemberg) and other high molecular weight compounds, as well as natural materials such as, wool, silk, jute, hemp, cotton, linen, sisal, or ramie, and also blends containing some or all of these types of materials. Nonwoven materials can also be used, such as those that are generally described in Riedel "Nonwoven Bonding Methods and Materials", Nonwoven World, (1987), incorporated herein by reference in its entirety. An example of a suitable commercially available polypropylene/ethylene vinyl acetate (PP/EVA) film is material number DH245, which is commercially available from Clopay Plastics of Cincinnati, Ohio U.S.A. Another useful material is thermoplastic elastomer film (TPE). Thermoplastic elastomers combine the mechanical properties of rubber-based materials (e.g. high elasticity, abrasion resistance, and friction) with good processability and recyclability of thermoplastics. Neoprene rubber is also a suitable material for the fabric of the cases.

The case's composition and thickness help determine its cut resistance. You can increase the cut protection by increasing the material weight; using high-performance fibers; and by using composite yarns made with varying combinations of stainless steel, fiberglass, and high-performance materials.

Reinforcement layers can be added to the base fabrics for cut and tear resistance. Such reinforcement layers can be made from fibers selected from polymers (such as aramid (e.g. DuPont Kevlar); or ultrahigh-molecular-weight polyethylene, UHMWPE fibers (e.g. Honeywell Spectra, which can have an average tensile strength of up to about 3.7 GPa and average tensile modulus of up to about 130 GPa, ANSI Puncture Level 2-5; ANSI Cut Level A4, A5, A6), glass (S-Glass), carbon (e.g. Nippon Graphite Mesophase or Toray PAN carbon fibers), or metal (steel, stainless steel, ANSI Cut Level A6, A7), or combinations thereof. High performance polyethylene fibers.

The reinforcing fibers can be formed into a scrim, mesh, netting, or screen material and can be provided in either finely woven lightweight layers, or a heavier, coarse woven material, and then added to the outer fabric of the preferred "soft" cases, 100, 200, 300 and 400, by sewing, lamination or adhesive bonding, for example. This improvement would add a further degree of tamper resistance to these cases, so that they cannot be easily torn or cut by a knife or scissors to gain access.

The case materials for the first and second polymeric shell portions of cases 500 and 600 should be made of a polymeric (preferably moldable) material, such as a thermosetting or thermoplastic resin-containing material. Various polymers that are useful in this regard and may include acrylic, ABS, acetal, (such as Delrin) polypropylene, polycarbonate, high density polyethylene, nylon and PVC, or combinations and blends thereof. Less desirably, metals, such as aluminum, stainless steel or steel without a powder coat, and wood could be employed for these purposes. Additionally, polymeric alloys such as ABS/polycarbonate alloy that combines the strength and heat resistance of polycarbonate, but the flexibility of ABS, can be used. Alternatively, a blend containing PPO and polystyrene, is excellent for chemical and electrical resistance, and alternatively, PBT, which is a thermoplastic polyester. Most of these materials can be injection molded to provide a hinge area and cavity as well as locations for bonding the mechanical or magnetic locking mechanisms, for example.

While the cases of this invention 100, 200, 300, 400, 500, 600 and the selective locking mechanisms 120, 420, 520, 524, 624 make it impossible to snap pictures, shoot videos or send text messages during a performance when the case is locked, the cases 100, 200, 300, 400, 500, 600 should allow phone signals to get through their thickness so that a user can feel a phone vibrate when a message arrives, when the mobile phone is set in "silent" mode. Accordingly, the cases 100, 200, 300, 400, 500 preferably should not contain or should minimize the presence of clear amorphous glass, glass wool insulation, gypsum, plywood or solid wood, brick, ceramic material, and metals and cardboard. Specifically, the materials used to make the cases 100, 200, 300, 400, 500, 600 preferably should not be radio frequency-blocking, such as are Faraday cages, or copper taffeta fabric, which would completely block phone signals. Materials like copper foil or mesh preferably should not be used extensively since they will absorb magnetic energy as well as radio waves. While thin amounts of non-conductive materials such as paper, cotton and rubber will not affect radio frequency waves, as these materials become thicker, there is a greater chance they will absorb the radio wave energy and therefore divert or block it.

In addition to radio frequency concerns, an important aspect of the present invention is to prevent access to the operation of the fingerprint sensor or a facial recognition sensor with which many mobile phones are equipped. In order to accommodate this purpose, the window 330 or 430 of transparent or translucent material, such as a polymeric layer which is optionally bonded, sewn or adhered to the fabric or polymeric shell of the cases 100, 200, 300, 400, 500, 600 should be relatively transparent or translucent enough to see the indicia of time, but sufficiently thick, or optically distortive, in order to defeat biometric sensors. Such sensors can include, for example, Face ID, facial and iris recognition, and fingerprint ID as biometric entry points to a mobile phone. In the case of fingerprint sensors (and other optical sensors) which are a separate button, or in-display (under the screen) most employ optical scanners that use light to illuminate the finger (face or iris). A tiny camera under the screen, for example, takes an image of your finger (or face or iris) which is then compared to a stored image. In-display fingerprint scanners are increasingly also of the ultrasonic variety instead of optical. These units work using ultrasound to build up an image of your fingerprint and work better with contaminated fingerprints, if they are wet or oily with sunscreen, for example. They work essentially like facial recognition for your finger. Currently, ultrasonics can penetrate through glass (up to 800 micrometers or microns thick) and metal (up to 400 microns thick), so thicker window materials are desirable.

Fingerprint sensors, whether they be thermal sensors like the devices from NEXT Biometrics, capacitive sensors like those from Credence ID One, or ultrasonic sensors like those from Qualcomm, depend upon capacitance, heat or reflected ultrasound to generate a 3D map of the finger surface. Unlike thermal, capacitive and optical sensors which only capture 2D images, the ultrasonic fingerprint sensor works through metal, glass and other solid surfaces. This helps the sensor more readily recognize a rolled finger even when it is dirty or wet. Desirably, the transparent materials used in the window 330 and 430 of the cases of this invention defeat both 2D and 3D fingerprint sensors. Desirably, the transparent material blocks or sufficiently distorts the electrical, thermal and/or sonic characteristics to prevent a reading. For example, a tinted, frosted, or merely thick enough film may distort the optical image sufficiently to prevent an optical scanner from working. If the film or layer is thick enough to prevent sufficient thermal or capacitive energy transmission, it could also defeat a capacitive or thermal fingerprint scanner. On the other hand, in order to defeat an ultrasonic transmission, the material must be capable of distorting or blocking ultrasonic energy. For example, a thin coating, sputtering, or vapor deposited layer of copper, aluminum, silver or gold could be applied to one side of the transparent material at thicknesses of less than 100 angstroms, preferably less than 50 angstroms, so that the material remains transparent for viewing time indicia, but substantially prevents access to fingerprint sensors of all known varieties. The coating should provide minimal or limited acoustic attenuation at a range of frequencies of operation of ultrasonic fingerprint sensors. For example, an aluminum coating should provide little or no acoustic attenuation at 1 to 12 MHz frequency range. Additionally, the transparent material can include filler material such a metallic powder, such as aluminum powder, with a concentration of the filler material small enough to keep the transparent material transparent or translucent (so as to view the time indicia), but large enough to impede or distort ultrasound energy coming from the sensor. For example, acoustically absorbing gels, metal powders, foams, epoxies, and/or liquids can be used. Desirably, these transparent materials will reflect, disperse or absorb sound rather than allow sound to travel through them unimpeded to the user's finger. In other words, it preferably should not be acoustically transparent or allow sound to pass through its thickness in both directions so that proper fingerprint identification can take place with an ultrasonic fingerprint sensor.

Both glass and plastic regardless of whether they are completely transparent or translucent, are solid objects that impede sound. At about 42 kHz, ultrasonic waves cannot pass through glass and plastic completely in a ranging cycle to target beyond the shielding of these materials. When placed in front of an ultrasonic sensor, the sensor will typically report the minimum reported distance. Color has no effect on the sound properties of the object. The issue is not always transparency to ultrasound (sound will travel within plastic materials for some distance quite well), but rather presenting the same impedance at the ultrasonic frequency as the intervening air does. Since most solids do not present the same impedance as air, the majority of the incident energy reflects off of the discontinuity (material transition) and only a small amount transfers through. So effective defeating of ultrasound may be provided by an air-gap between the mobile device ultrasonic sensor and the polymeric or other material of the window 330 or 430 (such as a spacer disposed on the inside of the case to provide an air gap by the window), or an air gap within the window itself, such as by combining two layers of glass or polymer sheet material or film with an entrapped air gap between them, or by foaming the window material itself to provide entrapped air bubbles. Optionally, if the phone itself can be kept from smoothly contacting the inside surface of the window, such as by a raised perimeter ridge of cloth or fabric disposed on the inside surface of the case or a mesh, netting or scrim disposed between the window film and the phone (and optionally bonded to the window), for example, there should be enough of an air gap between the LCD screen of the phone and the transparent or translucent window material to defeat operation of the ultrasonic fingerprint sensor (especially if the window material is rigid or semi-rigid and will not bend sufficiently to eliminate this air gap when depressed by a finger from the outside of the case.

In addition, the fabric of the soft cases, 100, 200, 300 and 400 should also not allow the operation of ultrasonic fingerprint sensors, even without a window (or its transparent or translucent materials) to show access to the time on device screens. In such instances, the fabric itself should have similar properties and use similar materials as those described herein for the windows 330 and 430 (and/or its transparent or translucent materials), so as to defeat ultrasonic fingerprint sensors, or users would otherwise be able to access digital assistants such as Apple's Siri, Google's Assistant, or Amazon's Alexa, and other like services, to record sound at a concert or send a transcribed verbal text message in class, for example. Preferably, these ultrasonic energy blocking or distorting techniques, do not also block or substantially distort radio wave energy from penetrating the fabric of the case, so that the mobile electronic device can receive a call and vibrate to alert the user to unlock her phone. Such dual purposes may be provided by trapped air in the fabric (air gaps being a known ultrasonic energy retardant, but not known to block radio waves, for example), such as that provided by a knitted or woven material which entraps air in the gaps between the fibers in the yarns, and in the spaces formed between the weft and warp knit and woven yarns, or by using multiple layers of fabric materials which form an air gap between them.

Locking Mechanisms and Tags:

The cases of this invention 100, 200, 300, 400, 500, 600 are provided with selective locking mechanisms, such as disclosed by mechanism portions 120, 420, 520, 524, 624. Selective locking mechanisms, also commonly referred to as "security tags" or "tags" by the fashion industry, can be broadly broken down into three main categories: electronic article surveillance (EAS) tags, visual deterrent tags and benefit denial.

The EAS system sees the tags in the cases in communication with an antenna housed near the entrance of a concert venue or school, for example. When the tagged case comes into proximity of this antenna, an alarm sounds, alerting concert staff or school personnel, for example, to someone leaving the venue without unlocking their phone, or a student leaving school without permission. There are two main EAS systems (radio frequency and acousto magnetic) and the difference is the frequency at which the tags and antenna operate.

Benefit denial tags see the case impacted when the concert goer or student tries to remove the tag. The most common form is ink dye tags which release indelible ink when the tag is tampered with.

Visual tags give the appearance that an EAS system is in place but do not actually have a receiver that communicates with an antenna. This means they offer a visual deterrent for concert goers and students rather than sounding an alarm and alerting staff when a phone is being accessed. This is the preferred type of tag for the present cases.

In addition to different types of tags, there are different type of locking mechanisms. The preferred locking mechanisms preferably comprise up to three key elements; the tag (which houses the receiver in the case of EAS), the pin, and the receiving chamber (which secures the pin in place).

There are two widely used types of locking mechanisms available; magnetic and mechanical, with magnetic locking mechanisms available in a series of strengths ranging from standard to SuperLock, HyperLock and Multi-polar.

The stronger the magnetic lock, the harder it is to remove the phone from the case, which is why a minimum strength of SuperLock is recommended.

In addition to the strength of the locking mechanism, a key factor to consider when selecting locking mechanisms is the size of the pin head. The larger the pin head the less likely it is to be illegally removed by pulling it through the fabric or shell of the case.

From the foregoing, it can be realized that this invention provides improved cases for selected access to mobile electronic devices. The cases of a first embodiment, provide access to viewing an indicia of time either by way of a battery operated or solar powered clock, or by viewing the time on the display of the mobile electronic device itself through a window made of transparent or translucent material. Ideally, the transparent material also defeats common fingerprint and biometric sensors. Although various embodiments have been illustrated, this is for the purpose of describing, but not limiting the invention. Various modifications which will become apparent to one skilled in the art, are within the scope of this invention described in the attached claims.

We claim:

1. A fabric case for limiting a user's ability to control said user's own mobile electronic device, said fabric case comprising front and rear portions joined together and defining therein an opening for receiving said mobile electronic device, and
    a magnetic locking mechanism for securing said opening in a first locked position to prevent operational access to said mobile electronic device by said user until a predetermined condition is met, said fabric case including a fabric comprising:
    a reinforcement scrim layer being added to the fabric by sewing, lamination or adhesive bonding, said reinforcement scrim layer which assists in resisting tampering by the user, wherein
    said fabric with its incorporated reinforcement scrim layer does not block or distort radio wave energy from penetrating the fabric of the case;
    wherein said fabric with its incorporated reinforcement scrim layer blocks an ultrasonic signal so as to prevent said user's access to an ultrasonic sensor located on said mobile electronic device.

2. The fabric case of claim 1, wherein said reinforcement scrim layer comprises a non-metallic material which is cut and tear resistant.

3. The fabric case of claim 2, wherein said non-metallic material comprises nylon, aramid, polyethylene, glass, or carbon.

4. The fabric case of claim 1, wherein said fabric with its incorporated reinforcement layer is not easily torn or cut with a knife or scissors to gain access to said mobile device.

5. The fabric case of claim 1, further comprising a second opening disposed through a wall of said fabric, and a transparent or translucent material joined to said fabric and substantially covering said opening.

\* \* \* \* \*